United States Patent [19]

Thorn

[11] Patent Number: 4,964,516
[45] Date of Patent: Oct. 23, 1990

[54] DAMPED EXTENDED-MOTION STRUT

[75] Inventor: Richard P. Thorn, Erie, Pa.

[73] Assignee: Lord Corporation, Erie, Pa.

[21] Appl. No.: 408,830

[22] Filed: Sep. 18, 1989

[51] Int. Cl.$^5$ .............................................. B60G 13/02
[52] U.S. Cl. ................................ 267/140.1; 248/636;
267/14.1; 267/14.2; 267/219; 267/257
[58] Field of Search ............. 267/140.1 A, 140.1 AE,
267/140.1 R, 140.1 C, 141, 141.1, 141.2, 141.3,
141.4, 141.5, 141.6, 141.7, 219, 153, 154, 35,
219, 273, 276, 279, 280, 281, 282, 257; 188/129,
130, 271; 180/297, 300, 314; 248/636, 560, 638

[56] References Cited

U.S. PATENT DOCUMENTS

| | | | |
|---|---|---|---|
| 2,752,142 | 6/1956 | Forcellini | 188/129 |
| 3,232,597 | 2/1966 | Gaydecki | 267/219 |
| 3,696,891 | 10/1972 | Poe | 188/268 |
| 3,795,391 | 3/1974 | Poe | 267/136 |
| 3,820,634 | 6/1974 | Poe | 188/268 |
| 4,518,058 | 5/1985 | Fister et al. | 267/225 |
| 4,583,621 | 4/1986 | Tangorra | 188/67 |
| 4,706,946 | 11/1987 | Thorn | 267/292 |

Primary Examiner—Robert P. Olszewski
Assistant Examiner—Matthew C. Graham
Attorney, Agent, or Firm—Howson and Howson

[57] ABSTRACT

A strut assembly for connecting and damping motion between relatively movable objects. The strut assembly includes a casing containing a pair of movable connecting members which cooperate with ribbed slide elements and elastomeric layers in the casing to damp motion by inducing hysteresis in the elastomeric layers and creating friction.

24 Claims, 3 Drawing Sheets

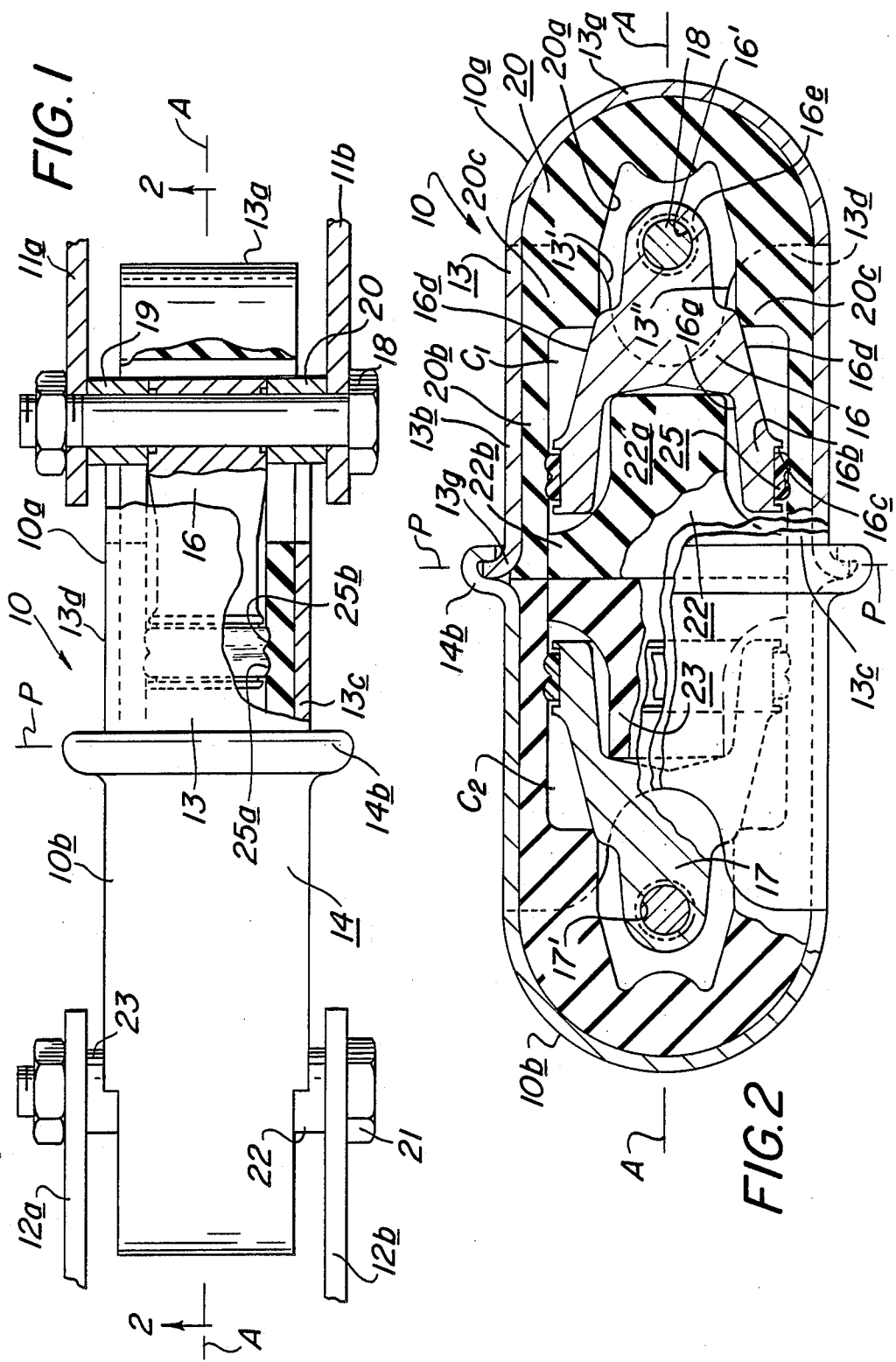

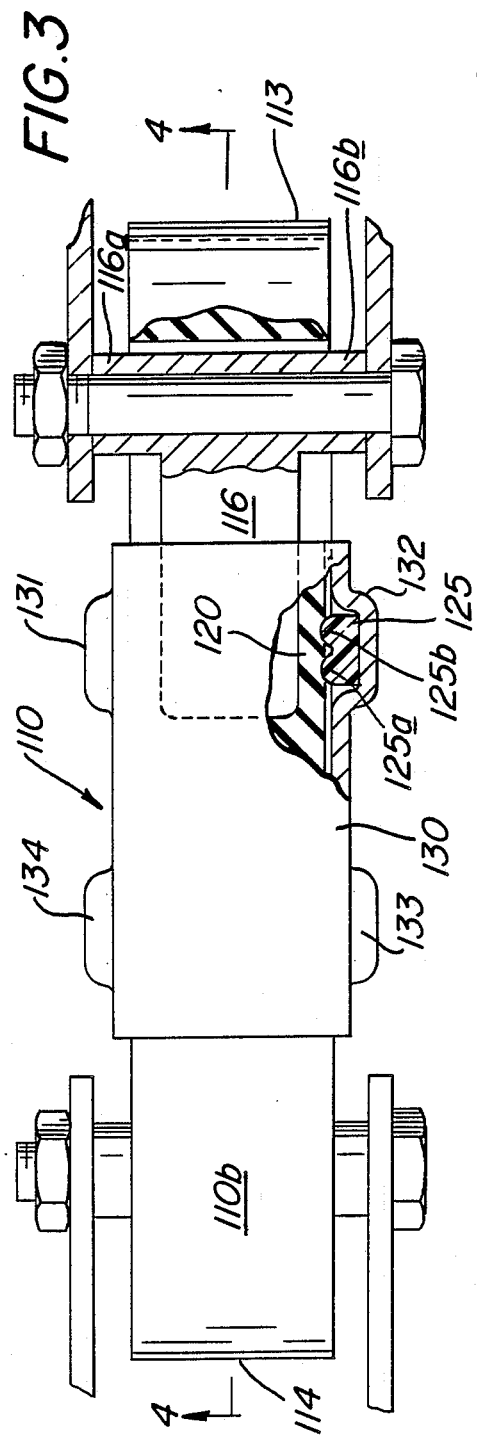
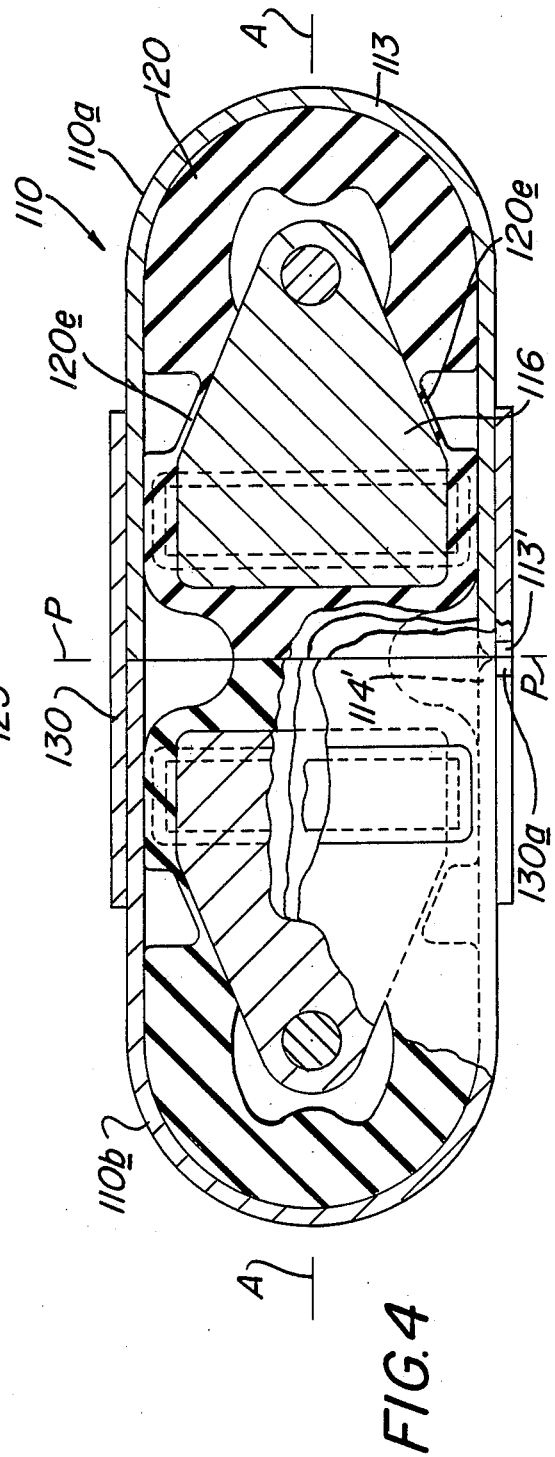

DAMPED EXTENDED-MOTION STRUT

FIELD OF THE INVENTION

The present invention relates to elements for providing a damped tension and compression connection between spaced objects, and more particularly the present invention relates to motion-damping torque struts such as find particular utility in vehicles to counter engine torque.

BACKGROUND OF THE INVENTION

In many front wheel drive automobiles currently on the market, the engine is mounted transversely in the engine compartment and is customarily supported on mounts and connected to a frame component of the automobile by means of a so-called torque strut. The torque strut functions to control angular displacement of the engine, such as when output torque increases during acceleration, and during braking, while accommodating normal engine oscillations, such as when the engine is operating at idle.

Known torque struts include an elongate member mounting at opposite ends a pair of sleeved rubber bushings for receiving a connecting bolt. While such struts have been capable of performing the aforedescribed functions, they have certain limitations. For instance, the rubber bushings at the ends of the struts are prone to deterioration due to large motions across the bushings while subjected to the heat of the engine so that, after a period of time, the bushings crack and stiffen. As a result, the struts develop a proclivity for transmitting vibrations and noises to the frame and hence into the passenger compartment, particularly during acceleration of the automobile when the strut is subjected to substantial tensile loads.

Special struts have been proposed to overcome some of the aforementioned problems. An example of such a strut may be found in U.S. Pat. No. 4,392,640. The patented strut utilizes rubber bushings having specially shaped interior cavities for providing the desired motion accommodation. U.S. Pat. No. 4,518,058 discloses a damped anti-torque strut which utilizes an hydraulic fluid displaceable axially in a chamber by means of a piston spring loaded into a central position.

A strut representing an improvement over the aforementioned struts is disclosed in U.S. Pat. No. 4,706,946 issued to Lord Corporation, the assignee of the present application. It incorportes friction elements to provide friction damping action.

Another type of mechanical connecting element useful for damping vibrations by utliizing elastomeric hysterisis and friction is disclosed in U.S. Pat. No. 3,232,597 to Gaydecki. In Gaydecki, a ridged or corrugated member slides relative to an elastomeric layer to effect the desired motion damping. Several embodiments of motion damping connecting elements are disclosed.

While the aforementioned struts may function satisfactorily for their intended purposes, there is a need for a durable and relatively low-cost torque strut which limits the transmission of engine vibrations over a broad range of engine operating conditions while being capable of readily being designed and manufactured to meet a wide variety of requirements.

OBJECTS OF THE INVENTION

With the foregoing in mind, a primary object of the present invention is to provide a novel strut assembly which is particularly suited for providing both a tension and a compression connection between relatively movable objects while simultaneously providing motion damping.

Another object of the present invention is to provide an improved torque strut which utilizes both friction and elastomeric hysteresis to provide the desired degree of motion damping.

A further object of the present invention is to provide a unique torque strut which overcomes the limitations of known torque struts by providing a desired amount of motion accommodation and damping without causing harsh snubbing action.

A still further object of the present invention is to provide a torque strut which is designed in such a manner as to enable different design requirements to be accommodated readily, which is reliable and rugged, and which can be manufactured efficiently utilizing known manufacturing technologies.

SUMMARY OF THE INVENTION

More specifically, the present invention provides a strut assembly for use in forming a motion-damped tension and compression connection between first and second relatively movable objects. The strut assembly comprises an elongate casing which is adapted to be disposed on an axis extending between the objects. First and second axially-spaced members are movably mounted in the casing and are adapted to be connected to the first and second objects respectively. The members are movable relative to one another in the casing. Intermediate elastomeric means is provided between the members for limiting motion toward one another in the axial direction, and terminal elastomeric means is provided in the casing for limiting motion of the members away from one another in the axial direction. Frictional and hysterisis motion damping is provided by an elastomeric layer which is contained in the casing alongside the axis and which cooperates with ribbed means carried in the casing in pressure engagement with the layer. The ribbed means is displaced relative to the elastomeric layer in response to the motion of either of the members relative to the casing. In one preferred embodiment, a lost motion connection is provided between at least one of the members and its associated ribbed means for enabling the member to move a predetermined distance relative to the elastomeric layer without effecting a corresponding amount of motion of the ribbed means. The terminal elastomeric means is shaped to deform and provide energy absorption which increases with increased motion.

BRIEF DESCRIPTION OF THE DRAWINGS

The foregoing and other objects, features and advantages of the present invention should become apparent from the following description, when taken in conjunction with the accompanying drawings in which:

FIG. 1 is a plan view of a strut assembly embodying the present invention, the strut assembly being partially broken away and sectioned to illustrate interior details of construction;

FIG. 2 is a longitudinal sectional view taken on line 2—2 of FIG. 1;

FIG. 3 is a view, similar to FIG. 1, but illustrating a modified embodiment of the present invention;

FIG. 4 is a longitudinal sectional view taken on line 4—4 of FIG. 3 but with portions of the outside of the casing shown in full.

DESCRIPTION OF THE PREFERRED EMBODIMENTS

Figure 5:
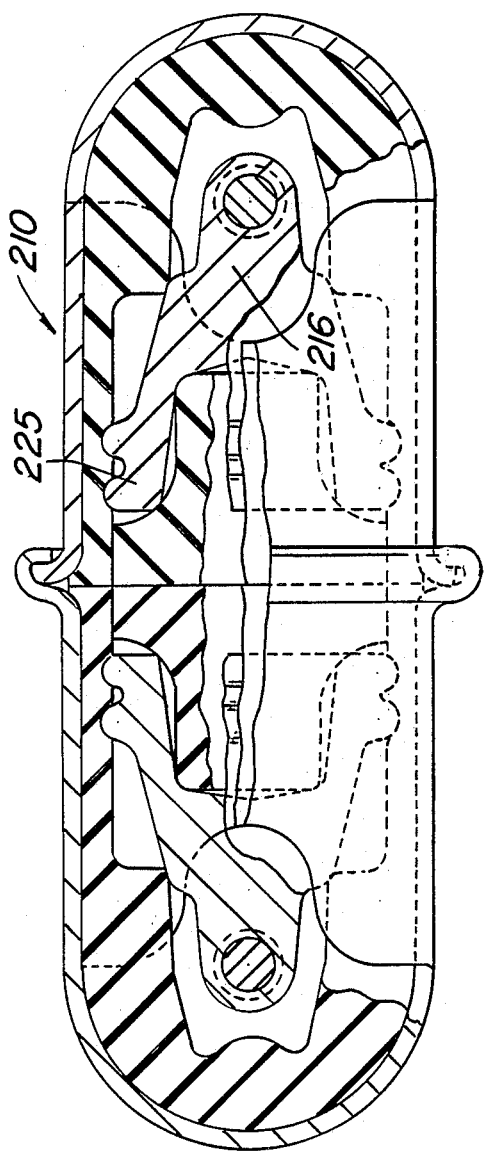
FIG. 5 is a longitudinal sectional view of another embodiment of the present invention but with portions of the outside of the casing shown in full.

Referring now to the drawing, FIG. 1 illustrates one embodiment of a strut assembly 10 constructed in accordance with the present invention. The strut assembly 10 is adapted to connect spaced relatively movable objects, such as the pair of spaced relatively movable brackets 11a, 11b and 12a, 12b. The strut assembly 10 is elongated on an axis A extending between the brackets 11a, 11b and 12a, 12b which may be components of a vehicle, such as an engine and a body or frame component. When thus installed, the strut assembly 10 can limit effectively the tendency of the engine to move relative to the vehicle by reacting either tensile or compressive forces applied on the axis A.

To facilitate manufacturing by maximizing the use of identical parts, the strut assembly 10 comprises two substantially identical strut sections 10a and 10b which are joined together along a medial plane P orthogonal to the longitudinal axis A. The right-hand casing section 10a comprises a formed metal shell 13 having a semicircular terminal strap-like end portion 13a and a medial box-like portion 13b defined by upturned and downturned pairs of flanges 13c, 13d, 13e, 13f, forming confronting channels joined along a horizontal plane. The flanges 13e–13f are relieved adjacent opposite ends of the strut assembly at 13', 13" to provide mounting clearances. The companion strut section 10b likewise includes a metal shell 14 which is shaped similar to the shell 13 but which has crimped flange portions 14b embracing an outturned flanges 13g of its companion shell 13 to form a secure transverse interlock along the medial plane P. In the illustrated embodiment, the shells 13 and 14 are rectangular in transverse cross section and have hollow elongate centrally located interior chambers $C_1$, $C_2$. The interlocked shell sections 13 and 14 cooperate to form a unitary strut casing 10 which, as will be described, can accept tensile forces applied on the axis A.

For connecting the strut assembly 10 to the relatively-movable brackets, a pair of connecting members 16 and 17 are mounted in the casing chambers $C_1$, $C_2$ for movement relative to their respective strut sections 10a and 10b, and for movement relative to one another in the chambers $C_1$, $C_2$. In the illustrated embodiment, both connecting members 16 and 17 are of identical construction, but there may be installations which might require them to be different. The first connecting member 16 has a terminal lug end portion 16e with a through bore 16' which is adapted to receive a fastener, such as the bolt 18, spanning across the member 16 and the brackets 11a, 11b. Preferably, spacers 19 and 20 (FIG. 1) are provided between the insides of the brackets 11a and 11b and the opposite sides of the connecting member 16 which, as best seen in FIG. 1, has a widthwise dimension which is less than the widthwise dimension of the casing chamber $C_1$ to facilitate assembly. The relief provided in the opposed flanges of the strut casing sections 10a, 10b provide a clearance for enabling the shell 13 to move axially relative to the brackets 11a, 11b. The companion, or second, connecting member 17 has a terminal lug end with a similar through bore 17' which is parallel to the bore 16' and which is connected by a bolt 21 and spacers 22 and 23 to the brackets 12a, 12b. When the strut sections 10a, 10b are square in crosssection, rather than rectangular, they may be arranged with the connecting bolt axes disposed at right angles to one another rather than parallel as shown.

Since both sections 10a and 10b of the strut assembly are of like construction, further discussion will focus on the right hand connecting member 16 and associated structure, it being understood that the same comments apply to the left hand connecting member 17 and its associated structure.

The right-hand connecting member 16 has a main body portion which is preferably of die cast metal, such as aluminum. The connecting member 16 has a rectangular recess 16a which opens toward the medial plane P and which is defined by a continuous flange 16b having a peripheral groove 16c. The connecting member 16 has a pair of tapered surfaces 16d, 16d, which converge toward the axis A from the region of the peripheral groove 16c toward the lug portion 16e in which the bore 16' is formed.

The connecting member 16 is completely surrounded by a molded mass of elastomeric material 20 provided in the shell 13. The elastomeric material 20 has a terminal end portion 20a which is recessed to receive the lug portion 16e of the connecting member 16 and which has a box-like wall portion 20b extending from the terminal end portion 20a to the medial plane P. The wall portion 20b surrounds the peripheral flange 16b of the connecting member 16 in spaced relation. The elastomeric material 20 is shaped to engage the inner surface of the shell 13 and may be, and preferably is, bonded thereto. The terminal end portion 20a of the elastomeric material 20 has a pair of protrusions 20c, 20c which project inwardly from the casing 13 transversely of the axis A to provide shoulders that engage the tapered surfaces 16d, 16d of the connecting member 16 in the manner illustrated in FIG. 2 when the strut assembly 10 is in its normal atrest position. The terminal end portion 20a of the elastomeric material 20 is suitably recessed around the lug 16e in the manner illustrated to provide space for accommodating deflection of the protrusions 20c, 20c as the connecting member 16 moves axially rightward in use. The shouldered protrusions 20c, 20c of the elastomeric mass 20 engage the tapered surfaces 16d, 16d of the connecting member 16 over increasing areas as the connecting member 16 moves axially rightward, thereby created increasing frictional forces which aid in gently arresting axial rightward movement of the connecting member 16. Extreme rightward excursions of the connecting member 16 are completely arrested by an axial elastomeric abutment 20d formed in the elastomeric mass 20 and located in the path of movement of the lug 16e.

In order to restrain axial inward motion of the connecting member 16, a block of elastomeric material 22 is provided in the casing chamber $C_1$. The elastomeric block 22 has a protrusion 22a which is received within the recess 16a of the connecting member 16 and a base 22b extending outwardly from the protrusion 22a across the ends of the connecting member flange 16b. An identical block of elastomeric material 23 abuts the block 22 along the medial plane P and is similarly disposed with respect to the connecting member 17. Thus, the blocks 22 and 23 provide a centrally-located cushion which deforms in compression in response to axial inward motion of the connecting members 16 and 17, thereby absorbing energy imparted in that direction and limiting axial inward motion of the connecting members.

For the purpose of damping motion of the connecting members, such as the connecting member 16 relative to its casing section 10a, ribbed means is mounted in the chamber $C_1$ for movement relative to the elastomeric mass 20 in response to motion of the connecting member 16. In the embodiment illustrated in FIGS. 1 and 2, the ribbed means includes a collar-like slide element 25 carried on the connecting member 16 and mounted in its groove 16c. Preferably, the ribbed slide element 25 has a plurality of contoured ribs, such as the pair of continuous, spaced, parallel, smoothly contoured ribs 25a, 25b formed in its outer periphery and disposed in pressure engagement with the elastomeric layer 20b which surrounds it. Thus, when the slide element 25 is displaced in alternate directions by the connecting member 16 along the inside of the elastomeric wall 20b, hysteresis develops within the elastomeric material of the wall 20b to damp motion of the connecting element 16. Some energy is also dissipated due to frictional sliding motion of the slide element 25 along the wall 20b. For a more detailed description of the theoretical underpinnings of this mechanism for providing motion damping, reference is made to U.S. Pat. No. 3,232,597 to Gaydecki, the disclosure of which is incorporated by reference herein.

The slide element 25 has a predetermined widthwise dimension, i.e. dimension parallel to the axis A. If desired, it may be dimensioned to completely occupy the axial extent of the groove 16c in the connecting member 16, in which event it is directly coupled to the connecting member 16 so that all axial motion of the connecting member 16 causes the slide element 25 to move along the elastomeric layer 20b. Also, because of the rectangular shape cocking motions of the member 16, such as vertically arcuate in FIG. 1 and horizontally arcuate in FIG. 2, result in damping of undesirable rotational motions in engine suspensions.

There are many applications in which it is desirable to permit the connecting element 16 to move slight distances axially relative to the shell 13 without inducing friction or hysteresis damping. To this end, a lost motion connection is provided between the slide element 25 and the connecting member 16. In the embodiment illustrated in FIGS. 1 and 2, the lost motion connection is provided by causing the slide element 25 to have a slightly narrower widthwise dimension than the widthwise dimension of the groove 16c and by causing it to have a coefficient of sliding friction relative to the connecting member 16 which is lower than the coefficient of sliding friction between it and its juxtaposed elastomeric layer 20b. Typically, for automotive engine mounting applications, the widthwise dimension of the groove 16c is in a range of about 0.010 to 0.080 inches greater than the widthwise dimension of the slide element 25.

The material of which the slide element 25 is composed is important. It should have a ratio of static to dynamic, or sliding, coefficients of friction of approximately unity, with a relatively high coefficient relative to the elastomeric layer and a relatively low coefficient with respect to the material of which the connecting member 16 is composed. By way of example, polymeric compositions of reinforced nylon having up to about 20%, by weight, tetrafluoroethylene and about 2%, by weight of silicone lubricant additives are desirable for the slide element 25. Such a composition eliminates the need for a lubricant, such as a grease. For an engine mounting application, the coefficient of relative sliding friction between the ribbed outer surface 25a, 25b of the slide element 25 and its juxtaposed elastomeric layer 20c should be in a range of about 0.2 to about 2.0, and the corresponding coefficient of relative sliding friction between the inner surface of the slide element 25 and the bottom of the groove 16c of the connecting member 16 should be in a range of about 0.01 to about 0.1. Precompression of the elastomeric layer 20c by the ribs 25a, 25b should be in a range of about 5% to about 30% of its thickness in the direction of applied compression.

Assembly of the embodiment illustrated in FIGS. 1 and 2 is straightforward. Each strut section 10a and 10b is provided with the elastomeric material bonded therein. A slide element 25 is slid into place onto its associated connecting member by slipping it axially into its receiving groove from the lug end of the connecting member. Thereafter, the connecting members 16 and 17 are inserted, lug ends first, into their respective receiving chambers $C_1$, $C_2$. The elastomeric blocks 22 and 23 are then mounted in their receiving recesses in the connecting members 16 and 17 respectively, and the shells 13 and 14 are placed in a press in which their medial flanges are crimped together in the manner illustrated. The spacers 19 and 20 may be supplied with the strut assembly 10 and installed immediately prior to mounting between the brackets, or the spacers may be otherwise fastened to opposite sides of the connecting members after assembly as by welding, staking or adhesives.

The above-described embodiment of the present invention provides several advantages. Included among these advantages are the fact that the stiffness of the strut assembly 10 in the tension and compression directions can be designed to be independent of one another. Variations in amplitude sensitivity and damping can be made by varying either the dimensional relations or the compositions of the materials of which the assembly is formed, or both. The metal components can be formed from strip steel utilizing conventional punchpress equipment, and the other components can be formed either by injection molding or die casting techniques.

Another embodiment of the present invention is provided which affords certain manufacturing advantages, as well as the aforementioned functional advantages. Referring now to FIGS. 3 and 4, the modified strut assembly 110 is made from a single flat steel strip. The mating ends of sections 110a and 110b are joined together by a box-like metal coupling shell 130 which spans across the medial plane P and engages the outsides of the metal shells forming the strut assembly 110. The coupling shell 130 has a slot 130a in its bottom wall which receives outturned tabs 113' and 114' provided on the shell portions 113 and 114 of the casing sections 110a, 110b, respectively. Assembly can be effected simply by sliding the casing shell axially inside the coupling shell 130 until tabs register with the slot whereupon they snap into place either with, or without, further steps such as spot welding, or peening.

In order to provide motion damping, the coupling shell 130 is provided with vertically elongate lateral recesses 131, 132, 133, 134 (FIG. 3) in which are mounted correspondingly shaped elongate slide elements 125. In this embodiment, the slide elements are disposed with their ribbed surfaces 125a, 125b facing inward. See FIG. 3. A layer of elastomeric material 120 is molded around a solid wedge-shaped connecting member 116 which is adapted to be connected to a movable object, as by the bolt and bracket flanges illustrated. In this embodiment, the elastomeric material encases the connecting member 116 and provides an integral unitary structure for both the intermediate elastomeric means and the terminal elastomeric means as described in the embodiment of FIGS. 1 and 2. In this embodiment, the connecting member 116 has a pair of spacers 116a and 116b formed integral therewith. See FIG. 3.

This embodiment functions in much the same manner as the embodiment of FIGS. 1 and 2 to damp motion; however, the stiffness of the strut assembly 110 can also be varied by adjusting the amount of elastomeric material filling the space surrounding the connecting members. As in the embodiment of FIGS. 1 and 2, a lost motion connection can be provided by properly dimensioning the slide elements 125 relative to their receiving recesses, and of course, adjusting the relative coefficients of sliding friction. In this embodiment, some cocking motions of the connecting members, i.e. arcuate up and down motions in FIGS. 3 and 4, can be accommodated as a result of the deflectability of the thin elastomeric sections 120e on opposite sides of the connecting member.

A further embodiment of the invention is provided which does not incorporate a lost motion connection. In this embodiment, 210, which is illustrated in FIG. 5, the ribbed means 225 is formed integral with each connecting member, such as the connecting member 216. While this construction is simpler and less expensive to manufacture, it does not afford the advantages of providing amplitude sensitive damping or of enabling damping characteristics to be changed readily by simple substitution of different slide element materials or configurations.

In view of the foregoing, it should be apparent that the present invention now provides an improved strut assembly which overcomes the limitations of known strut assemblies yet which is rugged, reliable and straightforward to manufacture.

While preferred embodiments of the present invention have been described in detail, various modifications, alterations and changes may be made without departing from the spirit and scope of the present invention as defined in the appended claims.

I claim:

1. A strut assembly for providing a motion-damped tension and compression connection between a first object and a second object comprising:
an elongate casing adapted to be disposed on an axis extending between said objects,
a first member movably mounted in said casing and adapted to be connected to said first object,
a second member movably mounted in said casing and adapted to be connected to said second object,
said first and second members also being movable relative to one another in said casing,
intermediate elastomeric means located in said casing between said members for limiting motion toward one another in the axial direction,
terminal elastomeric means located in said casing for limiting motion of said members away from one another in the axial direction,
elastomeric means providing in said casing a deformable layer disposed alongside said axis, and
ribbed means in said casing in pressure engagement with said layer and responsive to the motion of either of said members relative to said casing for slidably deforming said elastomeric layer, whereby relative motion in a predetermined range between the first and second objects can be damped and relative motion beyond said range toward or away from one another can be arrested.

2. A strut according to claim 1 wherein said deformable layer is disposed on the interior of said casing and said ribbed means is carried on at least one of said first and second members.

3. A strut according to claim 2 wherein said one of said members is of unitary construction and said ribbed means is formed integral therewith.

4. A strut assembly according to claim 3 wherein said one of said members has a cavity located interiorly of said ribbed means for receiving at least a portion of said intermediate elastomeric means.

5. A strut assembly according to claim 4 wherein said one of said members has a bore extending transversely of said axis for receiving a fastener.

6. A strut assembly according to claim 5 which is substantially symmetrical with respect to a plane passing medially through said intermediate elastomeric means orthogonal to said axis.

7. A strut assembly according to claim 2 including means providing a lost motion connection between said one of said members and said ribbed means for enabling said one of said members to move a predetermined distance relative to said layer without effecting a corresponding amount of motion of said ribbed means.

8. A strut assembly according to claim 7 wherein said lost motion means includes a recess in said one of said members confronting said layer and a ribbed slide element mounted in said recess for sliding movement relative to said one member through said predetermined distance.

9. A strut assembly according to claim 8 wherein said ribbed slide element has a predetermined coefficient of sliding friction relative to said one member which is lower than the coefficient of sliding friction relative to said layer.

10. A strut assembly according to claim 1 wherein said elastomeric layer is provided on at least one of said first and second members and said ribbed means is provided on the inside of said casing.

11. A strut assembly according to claim 1 wherein said terminal elastomeric means includes an elastomeric protrusion for engaging at least one of said members as it moves axially in said casing and deforming elastically to provide a spring-like energy absorption action.

12. A strut assembly according to claim 11 wherein said elastomeric protrusion and said at least one member have surfaces that contact one another over increasing areas as said one member moves axially.

13. A strut assembly according to claim 1 wherein said intermediate elastomeric means includes an elastomeric block engaging said members and being compressible therebetween as said members move toward one another.

14. A strut assembly for providing a motion-damped tension and compression connection between a first object and a second object comprising:
an elongate casing adapted to be disposed on an axis extending between said objects,
a first member movably mounted in said casing and adapted to be connected to said first object,
a second member mounted in said casing and adapted to be connected to said second object, at least said first member being movable relative to said casing, intermediate elastomeric means located in said casing between said members for limiting motion toward one another in the axial direction, terminal elastomeric means located in said casing in juxtaposition with said first member for limiting motion of said first member away from said second member in the axial direction, elastomeric means providing in said casing a deformable layer disposed alongside said first member, and ribbed means in said casing in pressure engagement with said layer and responsive to motion relative to said casing for slidably deforming said elastomeric layer, whereby relative motion can be damped in opposite axial directions.

15. A strut assembly according to claim 14 wherein said ribbed means is carried on said first member and including means on said first member providing a lost motion connection between said first member and said deformable layer to permit limited movement of said first member relative to said casing without causing a corresponding amount of movement of the ribbed means relative to said elastomeric layer.

16. A strut assembly according to claim 15 wherein said lost motion connection is provided by a slide element having said ribbed means formed thereon and mounted on said first member for movement through a predetermined limited distance relative thereto.

17. A strut assembly according to claim 16 wherein the coefficient of sliding friction between said slide element and said first member is lower than the coefficient of sliding friction between said slide element and said deformable layer.

18. A strut assembly according to claim 14 wherein said terminal elastomeric means includes a pair of opposed protrusions in said casing disposed alongside the path of movement of said first member and cooperable with tapered surfaces thereon to engage the same over increasing areas of contact in response to increasing motion of the first member in one of said axial directions.

19. A strut assembly according to claim 14 wherein said first member has a central axial recess receiving at least a portion of said intermediate elastomeric means.

20. A strut assembly according to claim 14 wherein said ribbed means is carried on the inside of said casing and said elastomeric layer is provided on said first member.

21. A strut assembly according to claim 14 including a second member like said first member mounted in said casing for movement relative thereto and relative to said first member.

22. A strut assembly for providing a motion-damped tension and compression connection between a first object and a second object comprising:

an elongate casing adapted to be disposed on an axis extending between said objects, said casing being formed of two substantially identical sections joined together along a medial plane orthogonal to said axis;

a first member movably mounted in said casing and adapted to be connected to said first object;

a second member movably mounted in said casing and adapted to be connected to said second object;

said first and second members also being movable relative to one another in said casing, said first and second members having wedge-shaped surfaces facing away from said plane;

intermediate elastomeric means located in said casing between said members for limiting motion toward one another in the axial direction;

terminal elastomeric means located in said casing for limiting motion of said members away from one another in the axial direction, said terminal elastomeric means including opposed elastomeric protrusions slidably engaging said wedge-shaped surfaces on opposite sides of said axis;

elastomeric means providing in said casing a deformable layer disposed alongside said axis; and ribbed means in said casing in pressure engagement with said layer and responsive to the motion of either of said members relative to said casing for slidably deforming said elastomeric layer;

whereby relative motion in opposite directions can be damped between the objects.

23. A strut assembly according to claim 22 wherein each section of said casing has a rigid continuous U-shaped strap-like configuration having open sides adjacent each end for enabling a fastener to be connected to said first and second objects.

24. A strut assembly according to claim 23 wherein each section of said casing has opposed pairs of side flanges forming a channel located medially of said strut assembly for confining said elastomeric layer therein.

* * * * *